United States Patent
Ichinose et al.

(10) Patent No.: US 12,195,032 B2
(45) Date of Patent: Jan. 14, 2025

(54) SYSTEM FOR DETERMINING A ROAD SURFACE BASED ON OBJECTS ON THE SIDE OF THE ROAD

(71) Applicant: Hitachi Astemo, Ltd., Hitachinaka (JP)

(72) Inventors: Masanori Ichinose, Tokyo (JP); Akira Kuriyama, Hitachinaka (JP); Haruki Nishimura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 578 days.

(21) Appl. No.: 17/286,783

(22) PCT Filed: Oct. 23, 2019

(86) PCT No.: PCT/JP2019/041448
§ 371 (c)(1),
(2) Date: Apr. 19, 2021

(87) PCT Pub. No.: WO2020/095673
PCT Pub. Date: May 14, 2020

(65) Prior Publication Data
US 2021/0339765 A1    Nov. 4, 2021

(30) Foreign Application Priority Data
Nov. 7, 2018   (JP) ................. 2018-209810

(51) Int. Cl.
*G06K 9/00*        (2022.01)
*B60W 60/00*       (2020.01)
(Continued)

(52) U.S. Cl.
CPC ....... *B60W 60/001* (2020.02); *G01C 21/3815* (2020.08); *G06T 7/70* (2017.01);
(Continued)

(58) Field of Classification Search
CPC . B60W 2420/42; G06V 20/56; G06V 20/588; G06V 20/58
See application file for complete search history.

(56) References Cited

U.S. PATENT DOCUMENTS

2010/0295668 A1* 11/2010 Kataoka ............... B62D 15/029
                                                            701/533
2012/0226392 A1    9/2012 Kataoka
(Continued)

FOREIGN PATENT DOCUMENTS

DE   102012107885 A1   2/2014
JP     2010-160777 A   7/2010
(Continued)

OTHER PUBLICATIONS

PCT/JP2019/041448 International Search Report dated Dec. 17, 2019 (2 pgs.).
(Continued)

*Primary Examiner* — Gregory A Morse
*Assistant Examiner* — Owais Iqbal Memon
(74) *Attorney, Agent, or Firm* — Volpe Koenig

(57) ABSTRACT

A method determines the region where a vehicle can travel without changing clarity of the position information of the object detected by a sensor. An in-vehicle control device includes an object detection unit detecting the position of an object from image information captured by an image pickup device, an object information storage unit stores a preprocessing grid map including a position of a detected object set as an object occupied region and a position where no object has been detected is as an object unoccupied region, an information processing unit generates a determination grid map in which part of the object unoccupied region of the map is replaced with the object occupied region, and a road surface region determination unit that generates an automatic driving grid map in which a closed space sur- (Continued)

rounded by the object occupied region of the determination grid map is set as a road surface region.

5 Claims, 9 Drawing Sheets

(51) Int. Cl.
*G01C 21/00* (2006.01)
*G06T 7/70* (2017.01)

(52) U.S. Cl.
CPC ............... *B60W 2420/403* (2013.01); *B60W 2554/4041* (2020.02); *B60W 2554/801* (2020.02); *B60W 2554/802* (2020.02); *G06T 2207/30256* (2013.01)

(56) References Cited

U.S. PATENT DOCUMENTS

| | | | | |
|---|---|---|---|---|
| 2012/0271483 | A1* | 10/2012 | Samukawa | B60W 30/16 701/1 |
| 2013/0266175 | A1 | 10/2013 | Zhang et al. | |
| 2015/0149076 | A1 | 5/2015 | Strauss et al. | |
| 2016/0232412 | A1* | 8/2016 | Nishijima | G06V 20/56 |
| 2017/0043772 | A1 | 2/2017 | Watanabe | |
| 2017/0269201 | A1 | 9/2017 | Adachi et al. | |
| 2018/0022347 | A1* | 1/2018 | Myers | G06V 20/588 701/26 |
| 2018/0190016 | A1* | 7/2018 | Yang | G06V 20/58 |
| 2018/0365846 | A1* | 12/2018 | Sumiyoshi | G06T 7/11 |
| 2019/0019044 | A1* | 1/2019 | Motohashi | G08G 1/16 |

FOREIGN PATENT DOCUMENTS

| | | |
|---|---|---|
| JP | 2011-233151 A | 11/2011 |
| JP | 2014-142965 A | 8/2014 |
| JP | 2016-146113 A | 8/2016 |
| JP | 2017-037473 A | 2/2017 |
| JP | 2017-166966 A | 9/2017 |
| KR | 20170076169 A | 7/2017 |

OTHER PUBLICATIONS

Extended European Search Report dated Sep. 19, 2022 for European Patent Application No. 19882588.7.

Han, J. "Enhanced Road Boundary and Obstacle Detection Using a Downward-Looking LIDAR Sensor", Paper, IEEE Transactions on Vehicular Technology (2012).

* cited by examiner

SYSTEM FOR DETERMINING A ROAD SURFACE BASED ON OBJECTS ON THE SIDE OF THE ROAD

TECHNICAL FIELD

The present invention relates to an in-vehicle control device that detects an object around an own vehicle and a vehicle traveling around the own vehicle, and controls the traveling of the own vehicle based on a road surface region determined from the detection data.

BACKGROUND ART

Technology to detect an object around an own vehicle and an object traveling around the own vehicle and to estimate the environment around the vehicle is being developed. For example, PTL 1 discloses a technique in which observation data from a sensor is sampled and a distribution function of the angle representing the degree of dispersion centered on the azimuth angle from the intensity of the data is calculated, so that the distribution state of the reflection caused by the object over a plurality of grids in the occupied grid map is calculated and the state of the surrounding object is estimated with high accuracy.

CITATION LIST

Patent Literature

PTL 1: JP 2017-166966 A

SUMMARY OF INVENTION

Technical Problem

In the related art of PTL 1, the occupied grid map in consideration of affecting the plurality of grids is created according to the degree of the intensity obtained from the observed data, thereby clarifying the contrast between the occupied region and the unoccupied region of the object and more easily estimating the region where the vehicle can travel. However, there is a problem that the clarity in the position information of the detected object, which is the boundary of the region where the vehicle can travel, is lowered because the occupied region of the object is spread due to dispersion. That is, there is a problem that the traveling region of the vehicle must be set in a narrow area, avoiding an uncertain region with low clarity.

The in-vehicle control device of the present invention has been made in view of the above-mentioned conventional problems, and an object of the invention is to more clearly and easily determine a region in which a vehicle can travel.

Solution to Problem

In order to solve the above problems, the in-vehicle control device according to the present invention includes an object detection unit that detects a position of an object in front of an own vehicle from image information captured by an image pickup device, an object information storage unit that stores a pre-processing grid map in which a position where the object detection unit has detected an object is set as an object occupied region and a position where no object has been detected is as an object unoccupied region, an information processing unit that generates a determination grid map in which a part of the object unoccupied region of the pre-processing grid map is replaced with the object occupied region, and a road surface region determination unit that generates an automatic driving grid map in which a closed space surrounded by the object occupied region of the determination grid map is set as a road surface region.

Advantageous Effects of Invention

In an in-vehicle control device according to the invention, a road surface region in which an own vehicle travels is extracted by using a determination grid map in which an object occupied region has been complemented. Therefore, it is possible to improve the road surface region determination accuracy and reduce the processing load.

Objects, configurations, and effects besides the above description will be apparent through the description of the following embodiments.

DESCRIPTION OF EMBODIMENTS

Figure 1:
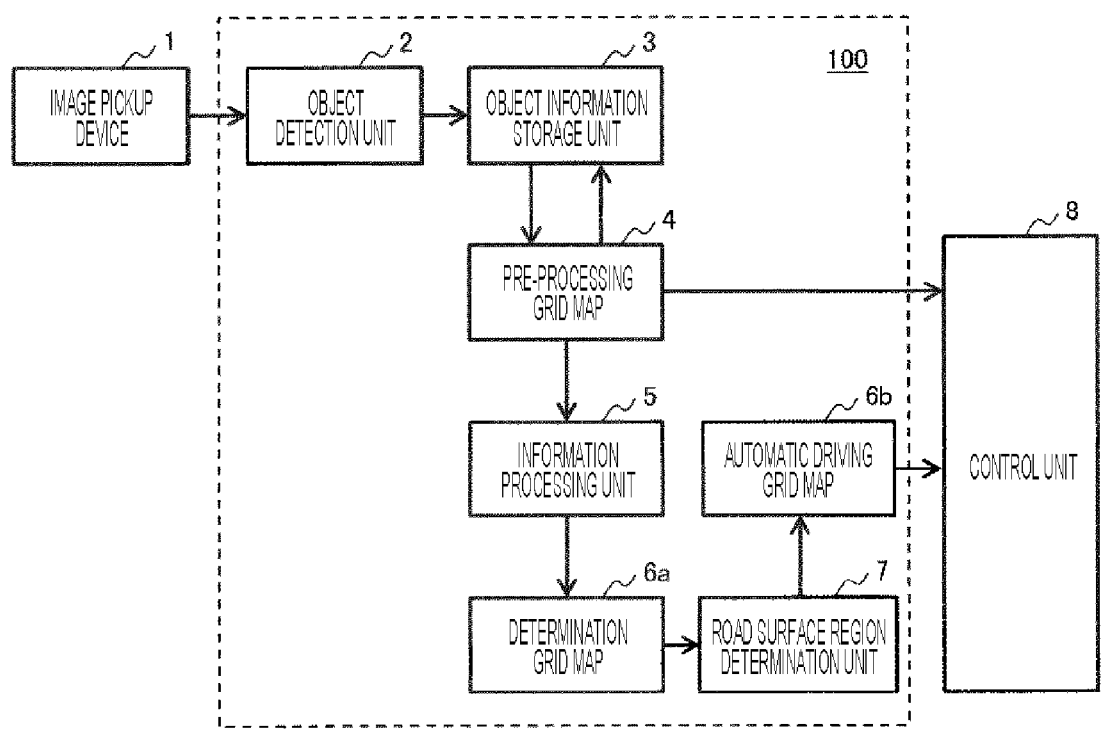
FIG. 1 is a functional block diagram of an in-vehicle control device according to a first embodiment.

Hereinafter, an in-vehicle control device according to the embodiments of the present invention will be described with reference to the drawings and the like. Although the following description illustrates specific examples of the content of the invention, the invention is not limited to the description. Various changes and modifications can be made, by those skilled in the art, within the scope of the technical idea disclosed herein. In all the drawings for describing the invention, components having the same function are designated by the same reference numeral, and the repeated description thereof may be omitted.

First Embodiment

An in-vehicle control device 100 according to a first embodiment of the invention will be described with reference to FIGS. 1 to 3. The in-vehicle control device 100 of this embodiment is called a surrounding environment estimation ECU (Electronic Control Unit) that estimates the road shape around an own vehicle 20 and the surrounding environment such as other vehicles, and provides surrounding environment information (specifically, various grid maps to be described later) necessary for executing automatic driving to a driving control ECU (hereinafter, referred to as the "control unit 8") that controls acceleration, steering, braking, and the like of the own vehicle 20. Although FIG.

1 illustrates a configuration in which the in-vehicle control device 100 (surrounding environment estimation ECU) and the control unit 8 (driving control ECU) are separated, the two may be integrated.

FIG. 1 is a functional block diagram of the in-vehicle control device 100. As illustrated in the drawing, the in-vehicle control device 100 generates a grid map based on image information captured by an image pickup device 1 and provides the map to the control unit 8 (driving control ECU). The in-vehicle control device 100 is actually a computer including hardware such as an arithmetic device (e.g., a CPU), a main storage device (e.g., a semiconductor memory), an auxiliary storage device (e.g., a hard disk), and a communication device. Then, each function to be described later is performed by the arithmetic device executing a program loaded in the main storage device and, description of such well-known techniques may be omitted, as appropriate, in the following description.

As illustrated in FIG. 1, the in-vehicle control device 100 includes an object detection unit 2, an object information storage unit 3, a pre-processing grid map 4, an information processing unit 5, a determination grid map 6a, an automatic driving grid map 6b, and a road surface region determination unit 7. Of these, the object detection unit 2, the information processing unit 5, and the road surface region determination unit 7 are realized by the above-mentioned arithmetic device executing a predetermined program. Further, the object information storage unit 3 is the auxiliary storage device described above, and grid maps, namely, the pre-processing grid map 4, the determination grid map 6a, and the automatic driving grid map 6b are also stored in this auxiliary storage device. Each of the above components will be described in detail below.

The object detection unit 2 detects an object position around the own vehicle 20 based on the image information captured by the image pickup device 1. The object information storage unit 3 stores the position information of the object detected by the object detection unit 2 in chronological order. The object information stored in the object information storage unit 3 is not limited to the above-mentioned position information, and may include, for example, relative speed information of the object, attribute information such as the color and type of the object, and the like. The object information storage unit 3 generates the pre-processing grid map 4 by updating the information of each cell of the grid map. Although the size of each cell on the grid map may be determined as appropriate, the following description will proceed assuming a cell with a side of one meter.

Figure 2A:
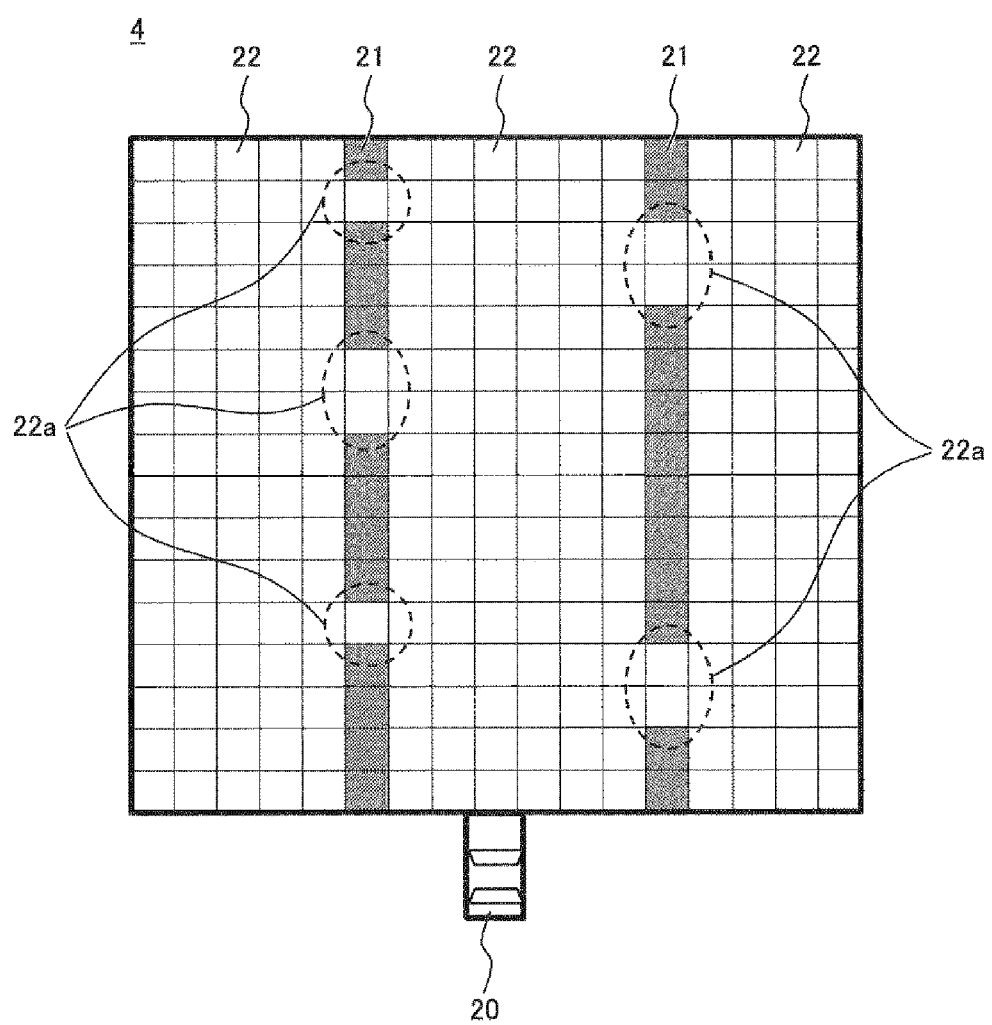
FIG. 2A is an example of a pre-processing grid map.

An example of the pre-processing grid map 4 will be described with reference to FIG. 2A. The pre-processing grid map 4 illustrated in the drawing is a grid map showing the environment in front of the own vehicle 20, and the cell in which the object detection unit 2 has detected the object (hereinafter, "object occupied region 21") is colored. In the example of FIG. 2A, the object occupied regions 21 are lined up in a straight line on the left and right sides of the own vehicle 20, and there are also a plurality of cells in which the object detection unit 2 has not detected the object on the same straight line (hereinafter, "object unoccupied region 22"). The linear object occupied regions 21 on the left and right of the own vehicle 20 are specifically structures such as sidewalk curbs, guardrails, guard poles, and fences, and an object unoccupied region 22a on the same straight line corresponds to a place where there are no curbs or fences, such as the entrance of a house.

When the pre-processing grid map 4 is updated, the information processing unit 5 generates the determination grid map 6a for determining a road surface region 23 on which the own vehicle 20 can travel. The determination grid map 6a facilitates the extraction of a closed space (that is, the road surface region 23 to be described later) by smoothing and simplifying the pre-processing grid map 4.

Figure 2B:
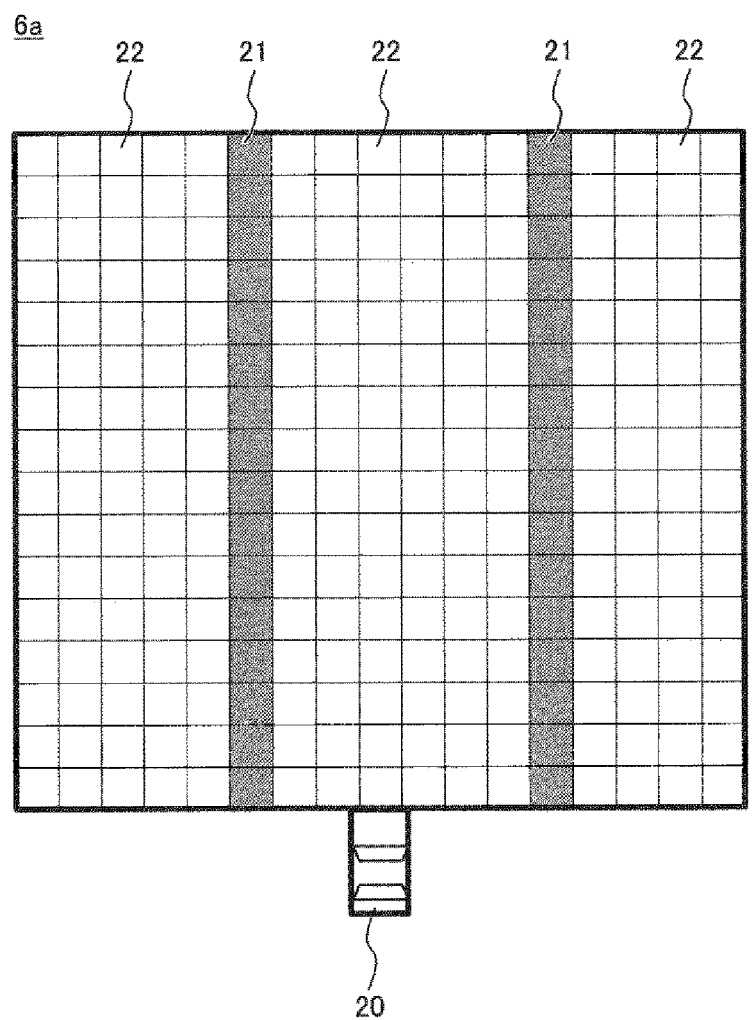
FIG. 2B is an example of a determination grid map.

An example of the determination grid map 6a will be described with reference to FIG. 2B. The determination grid maps 6a illustrated in the drawing is a grid map in which a plurality of object unoccupied regions 22 are continuously aggregated by replacing those satisfying a predetermined condition (object unoccupied region 22a) among the object unoccupied regions 22 in the pre-processing grid map 4 with the object occupied region 21.

Next, the information processing unit 5 that generates the determination grid map 6a based on the pre-processing grid map 4 will be described in more detail with reference to FIG. 3. As illustrated in the drawing, the information processing unit 5 includes an object region extraction unit 5a, an object region distance calculation unit 5b, and an adjacent object region complementing unit 5c. The object region extraction unit 5a extracts a continuous part of the object occupied region 21 from the pre-processing grid map 4. In the inter-object region distance calculation unit 5b, when there is a plurality of continuous parts of the object occupied region 21, each the distance between the continuous parts (the continuous distance of the object unoccupied region 22 sandwiched between the continuous parts of the object occupied region 21) is calculated. In the adjacent object region complementing unit 5c, when the distance calculated by the object region distance calculation unit 5b is equal to or less than a threshold (for example, two cells or less), both continuous parts are regarded as a continuous object occupied region 21. The adjacent object region complementing unit 5c then generates the determination grid map 6a in which the object unoccupied region 22a (for example, a gap of two cells or less) sandwiched between both continuous parts is replaced with the object occupied region 21.

In this way, the reason for replacing the object unoccupied region 22a with a short continuous distance with the object occupied region 21 is that even if there is a gap in a part of the structure such as a fence, if the gap is narrow, the own vehicle 20 cannot pass through, and thus the structure is regarded as being continuous and the determination grid map 6a is used which is complemented to keep the continuity of the object occupied region 21 as much as possible so as to extract the road surface region 23 where the own vehicle 20 travels, which is effective in improving the extraction accuracy of the road surface region 23 and reducing the extraction processing load.

In the above, an example in which the distance threshold when replacing the object unoccupied region 22 with the object occupied region 21 is set to a fixed value (two cells) has been described, but this distance threshold may be variable, and the distance threshold may increase as the speed of the own vehicle 20 increases. This is because even if the gap is the same (for example, a gap of three cells (three meters)), the own vehicle 20 can easily pass through at low speed; however, it is difficult to pass through at high speed when the turning radius is large. Thus, it is appropriate to generate the determination grid map 6a using a high-speed distance threshold at high speed.

When the determination grid map 6a is generated, the road surface region determination unit 7 determines the road surface region 23, which is a region in which the own vehicle 20 can travel, based on the determination grid map 6a, and generates the automatic driving grid map 6b.

Figure 2C:
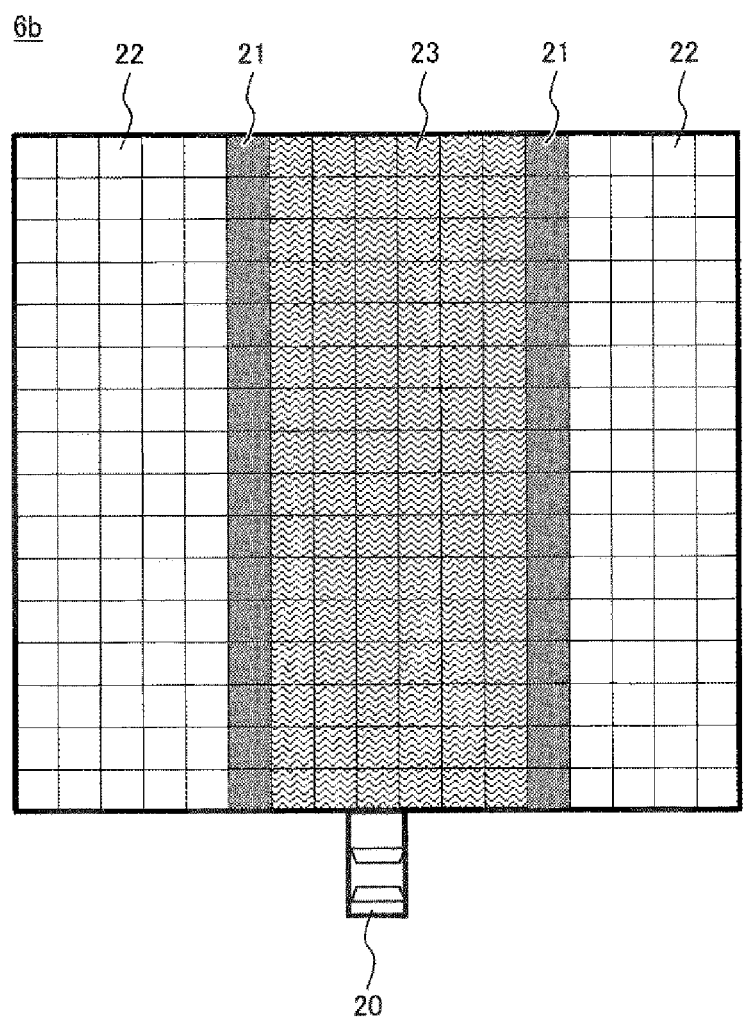
FIG. 2C is an example of an automatic driving grid map.

An example of the automatic driving grid map 6b will be described with reference to FIG. 2C. The automatic driving grid map 6b illustrated in the drawing is a grid map in which, among the object unoccupied regions 22 of the determination grid map 6a of FIG. 2B, those satisfying a predetermined condition are set in the road surface region 23. In the road surface region determination unit 7 of this embodiment, a closed space in front of the own vehicle 20 and surrounded by the object occupied regions 21 in the object unoccupied region 22 of the determination grid map 6a is determined as the road surface region 23 where the own vehicle 20 can travel.

As described above, in the in-vehicle control device 100 of this embodiment, after the determination grid map 6a obtained by simplifying the pre-processing grid map 4 in which the actual object position is recorded is generated, the road surface region 23 in which the own vehicle 20 can travel is determined based on this determination grid map 6a, and the automatic driving grid map 6b is generated. Further, the control unit 8 plans and controls the traveling state of the own vehicle 20 according to the surrounding environment by using the pre-processing grid map 4 and the automatic driving grid map 6b.

As described above, in the in-vehicle control device of this embodiment, the road surface region in which the own vehicle travels is extracted by using the determination grid map that has been complemented so as to maintain the continuity of the object occupied region as much as possible. Therefore, it is possible to improve the road surface region determination accuracy and reduce the processing load. Further, it is possible to reduce the communication load for transmitting the road surface region shape to the control unit by optimizing the road surface region shape.

Second Embodiment

Next, the in-vehicle control device 100 according to a second embodiment of the invention will be described with reference to FIGS. 4 and 5. Description of some points in common with the first embodiment will be omitted.

Figure 3:
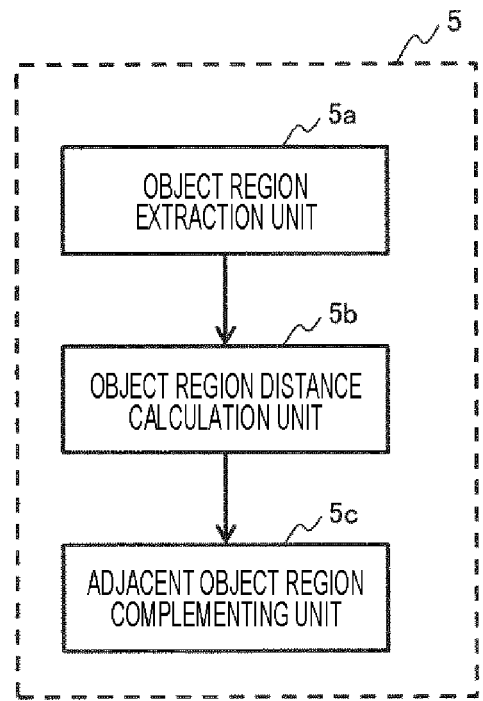
FIG. 3 is a functional block diagram of an information processing unit of the first embodiment.

In the first embodiment, it has been assumed that the object occupied region 21 is a curb or the like arranged in a straight line, and the determination grid map 6a is generated by using the information processing unit 5 of FIG. 3. However, in the second embodiment, the determination grid map 6a is generated using the information processing unit 5 illustrated in FIG. 4 so that the object occupied region 21 not arranged in a straight line can be dealt with.

Figure 4:
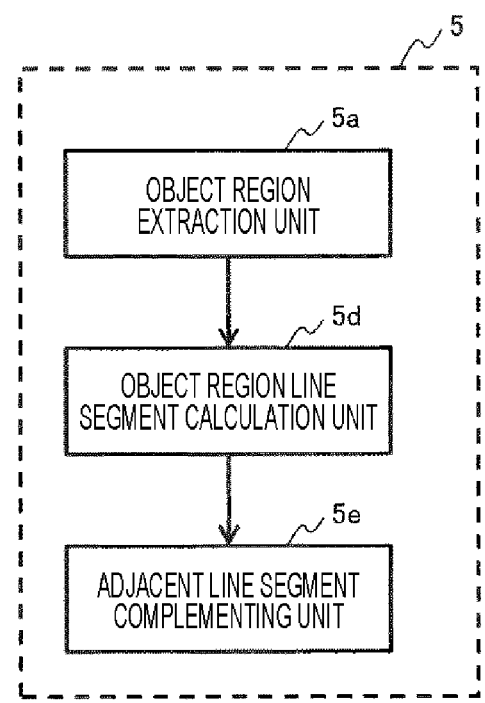
FIG. 4 is a functional block diagram of the information processing unit of a second embodiment.
Figure 5:
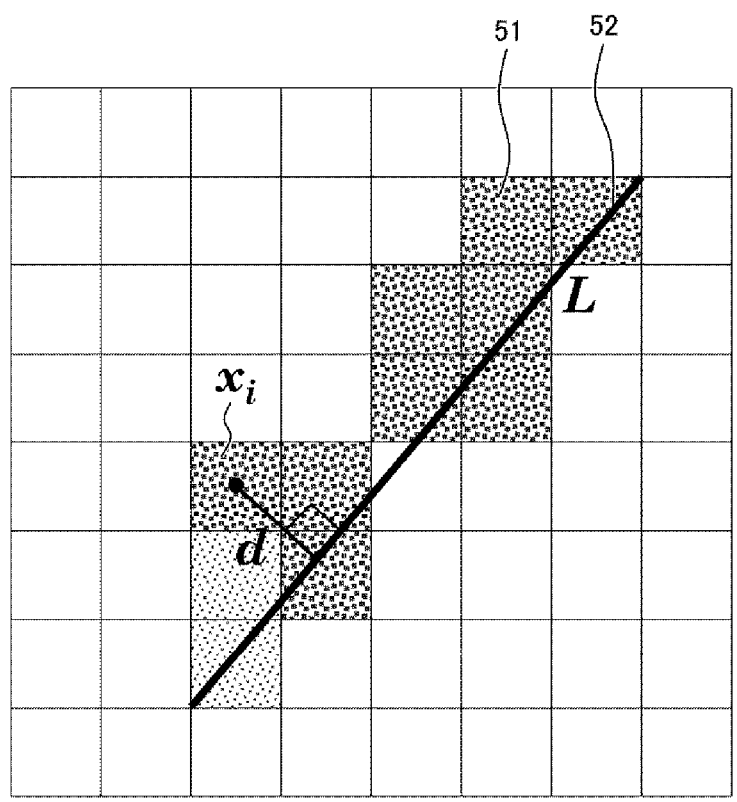
FIG. 5 is a conceptual diagram of a representative line segment in an object region related to the grid map of the second embodiment.

As illustrated in FIG. 4, the information processing unit 5 of this embodiment includes the object region extraction unit 5a, an object region line segment calculation unit 5d, and an adjacent line segment complementing unit 5e. The object region extraction unit 5a extracts a block of the object occupied region 21 from the pre-processing grid map 4. The object region line segment calculation unit 5d calculates a representative line segment L from each block when there is a plurality of blocks in the object occupied region 21. The adjacent line segment complementing unit 5e complements the line segments using the calculated representative line segment L. The complement condition for the line segments is that the line segment distance in the adjacent object occupied regions 21 is equal to or less than a threshold and the angle formed by the adjacent line segments is equal to or less than a threshold. As a result, complementation is performed not only when the distance between the line segments is short, but also when these line segments, which are the boundary lines of the road surface region 23, become smooth lines having a certain curvature or less. These thresholds may also be changed according to the own vehicle speed for the same reason as in the first embodiment.

Here, an example of a method of obtaining the representative line segment L from a block of object regions $x_i$ (i=1 to N) composed of N cells by the object region line segment calculation unit 5d will be described using FIG. 5. In the drawing, 51 indicates a block of object regions, and 52 indicates the representative line segment L. Assuming that the function representing the distance between the line segment L and the cell $x_i$ of the object region is $d(L, x_i)$, the evaluation formula $E_L$ of the line segment L is (Expression 1), and the line segment L that minimizes this evaluation formula $E_L$ is the representative line segment of the object region.

[Math. 1]

$$E_L = \sum_{i=1}^{N} d(L, x_i)^2 \qquad \text{(Equation 1)}$$

As described above, in the in-vehicle control device of this embodiment, even in a situation where the cells in the object occupied region are not arranged in a straight line, the road surface region where the own vehicle travels is extracted using the determination grid map in which the line segment obtained from the object region is processed so as to be continuous. Therefore, it is possible to improve the road surface region determination accuracy and reduce the processing load.

Third Embodiment

Figure 6:
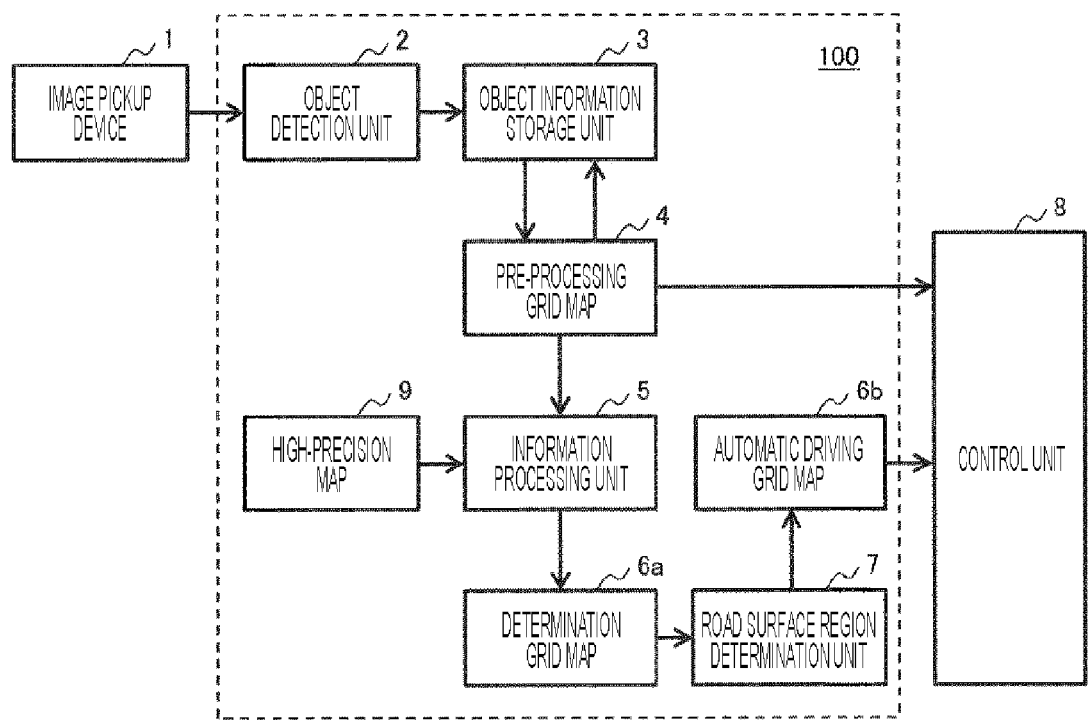
FIG. 6 is a functional block diagram of an in-vehicle control device according to a third embodiment.

Next, the in-vehicle control device 100 according to the third embodiment of the invention will be described with reference to FIG. 6.

Description of some points in common with the above-described embodiment will be omitted.

In this embodiment, when the information processing unit 5 processes information, the information of a high-precision map 9 prepared in advance is used together with the processing of the above-described embodiment.

With the progress of automatic driving technology in recent years, an environment in which high-precision maps can be easily used is being established, such as the commercialization of precise maps related to road shapes. Therefore, the information processing unit 5 of this embodiment acquires map information from the high-precision map 9 regarding the road shape around the own vehicle, and switches the distance threshold between the object occupied regions 21, for determining whether the complementation is performed on the portion where the road boundary on the map is continuous, so as to be longer than usual. That is, even if the distance threshold is set to two cells, the distance threshold is set to four cells or the like in the place where the continuity of the road boundary can be confirmed by the high-precision map 9, and the continuity of the object occupied region 21 is more easily maintained.

As a result, even when the object detection unit 2 fails to detect an object and the obtained object region information is unclear, a desired complementary processing is performed by using the high-precision map 9 together, and an appropriate determination grid map 6a can be obtained.

Fourth Embodiment

Figure 7:
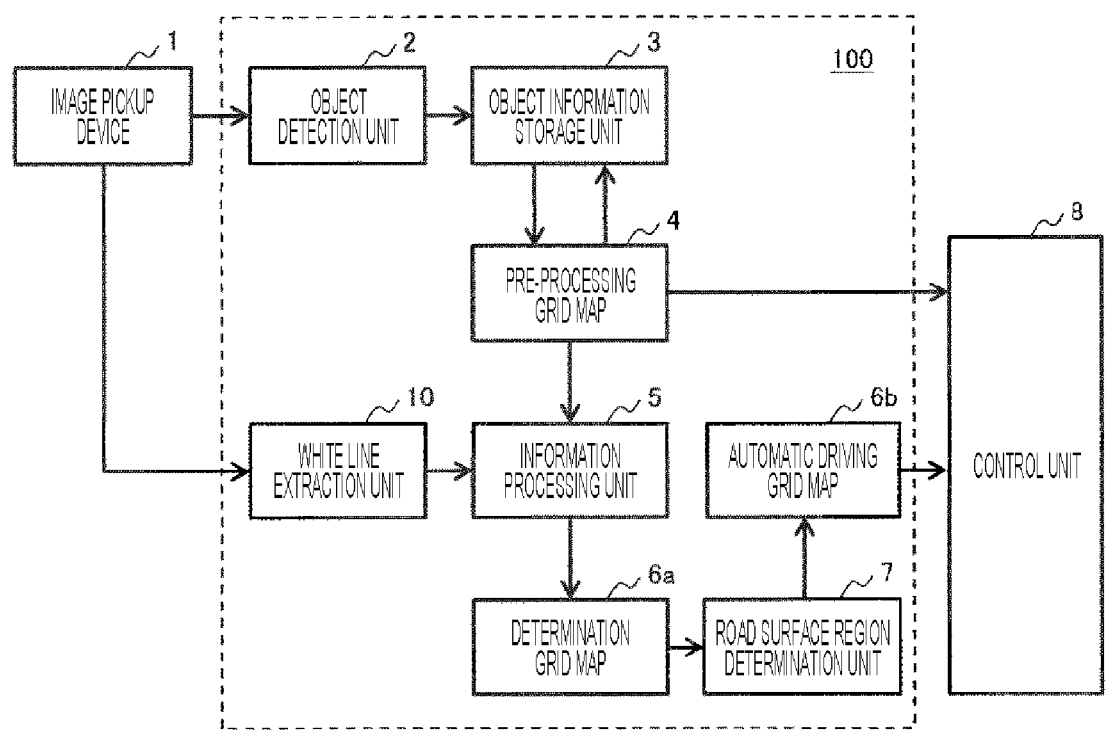
FIG. 7 is a functional block diagram of an in-vehicle control device according to a fourth embodiment.

Next, the in-vehicle control device 100 according to a fourth embodiment of the invention will be described with reference to FIG. 7. Description of some points in common with the above-described embodiment will be omitted.

In this embodiment, when the information processing unit 5 processes information, white line information of the road extracted from the image information captured by the image pickup device 1 is used together with the processing of the above-described embodiment. Then, in order to realize this, a white line extraction unit 10 is provided in the in-vehicle control device 100.

Due to the high performance of information processing devices in recent years, it has become relatively easy to obtain information on the shape of white lines of the road by image processing. Therefore, when the information on the road shape around the own vehicle is acquired from the shape and position of the white line of the road, and the continuity of the traveling zone on the road can be confirmed, the distance threshold is switched to be longer than usual.

As a result, even when the object detection unit 2 fails to detect an object and the obtained object region information is unclear, a desired complementary processing is performed by using the white line information together, and the continuity of the object occupied region 21 is easily maintained. In addition to the white line, complementation may be performed in the same manner as the method described above by extracting features and edges on the image such as curbs, guardrails, guard poles, and fences.

Fifth Embodiment

Figure 8:
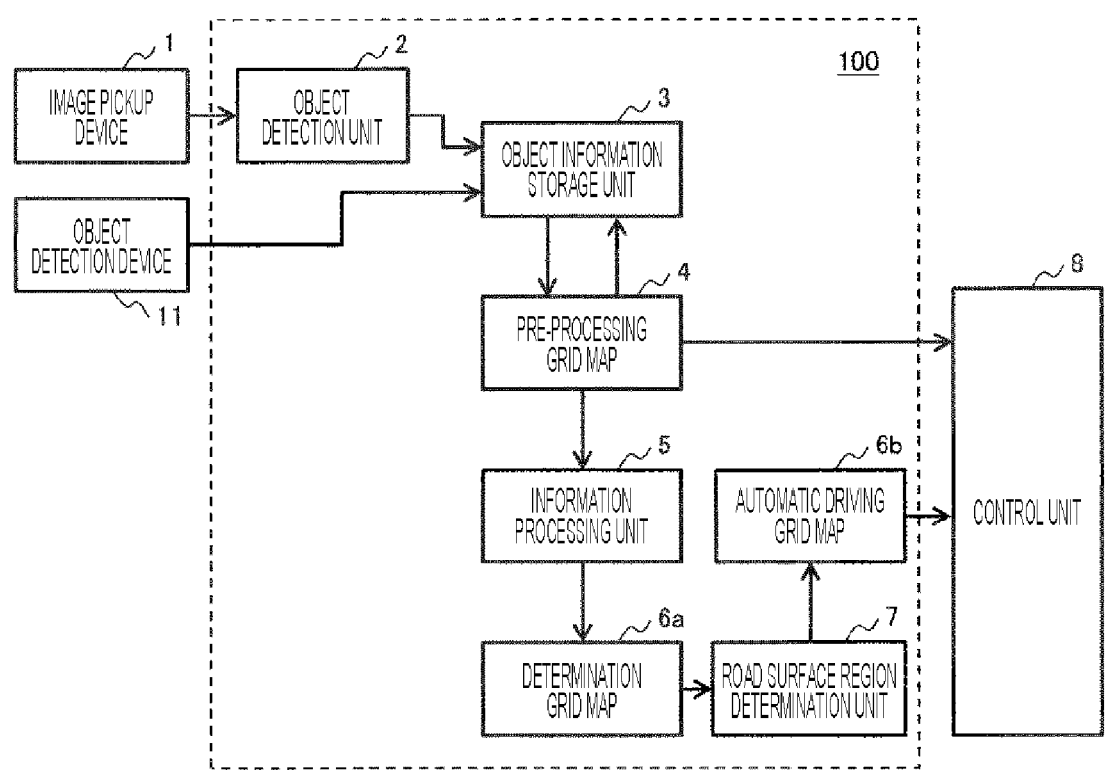
FIG. 8 is a functional block diagram of an in-vehicle control device according to a fifth embodiment.

Next, the in-vehicle control device 100 according to a fifth embodiment of the invention will be described with reference to FIG. 8. Description of some points in common with the above-described embodiment will be omitted.

In the above embodiment, only the image pickup device 1 has been used to grasp the surrounding environment of the own vehicle 20. However, in this embodiment, in addition to the image pickup device 1, the input information from an object detection device 11 using a sensor other than a camera is also stored in the object information storage unit 3 so as to generate the pre-processing grid map 4 with more accuracy. A plurality of the object detection devices 11 may be provided, and in that case, different sensors may be used for each.

As the object detection device 11 to be added, for example, a millimeter wave radar, a laser radar, a sonar, etc. can be considered. Since these detect an object by a physical phenomenon different from the detection principle by the image pickup device 1, it is possible to realize the object detection more reliably by increasing redundancy in object detection. Further, it is possible to reduce the blind spot in object detection by shifting the mounting position and viewing angle of the object detection device 11 from the image pickup device 1.

In such an object detection device 11, the object position is generally calculated and output directly by internal signal processing. The object information storage unit 3 accumulates the object positions output by the object detection device 11 in chronological order to generate the pre-processing grid map 4. As a method of accumulating object information, it is conceivable to set an independent grid map region for each of an object position based on an image obtained by the image pickup device 1 and an object position detected by one or more object detection devices 11, individually accumulate information, and perform fusion processing at the time of reference, generally, logical sum of cells occupying the object of the grid map.

However, when acquiring the object information, the information from all the detectors may be fused and accumulated in one common grid map. Regardless of the method of accumulating the object information, the information density of the object information can be increased by the plurality of object information detection units, and the road surface region can be determined with higher accuracy.

As described above, the embodiments of the invention have been described in detail with reference to the drawings. However, the specific configuration is not limited to the embodiments, any design changes and the like without departing from the gist of the invention may also be included in the invention.

REFERENCE SIGNS LIST 1 image pickup device
2 object detection unit
3 object information storage unit
4 pre-processing grid map
5 information processing unit
5a object region extraction unit
5b object region distance calculation unit
5c adjacent object region complementing unit
5d object region line segment calculation unit
5e adjacent line segment complementing unit
6a determination grid map
6b automatic driving grid map
7 road surface region determination unit
8 control unit
20 own vehicle
21 object occupied region
22, 22a object unoccupied region
23 road surface region

The invention claimed is:

1. An in-vehicle control device that is installed in a vehicle, for reducing a processing load, the in-vehicle control device comprising:
a memory;
a communication device; and
a processor communicatively coupled to the memory and communication device, the processor is configured to:
detect a position of an object in front of the vehicle from image information captured by an image pickup device;
store, in the memory, a pre-processing grid map in which a position where the processor has detected an object is set as an object occupied region and a position where no object has been detected is set as an object unoccupied region;
extract a continuous part of the object occupied region from the pre-processing grid map;
determine if there are a plurality of the continuous part of the object occupied region,
on a condition that there is one of the continuous part of the object occupied region, generate a determination grid map in which a part of the object unoccupied region of the pre-processing grid map is replaced with the object occupied region,
on a condition that there is the plurality of the continuous part of the object occupied region, calculate a distance between each of the plurality of the continuous part of the object occupied region where the object unoccupied region is located;
determine if the calculated distance is equal to or less than a threshold;
on a condition that the calculated distance is equal to or less than the threshold, generate the determination grid map in which a part of the object unoccupied region of the pre-processing grid map that is between at least two of the plurality of the continuous part of the object occupied region is replaced with the object occupied region; and generate an automatic driving grid map in which a closed space surrounded by the object occupied region of the determination grid map is set as a road surface region, wherein during the distance calculation the threshold is determined and the threshold is increased as a speed of the vehicle increases.

2. The in-vehicle control device according to claim 1, wherein the processor is further configured to:

extract a block of object occupied regions from the pre-processing grid map, calculate a representative line segment of each block when a plurality of the blocks exist, and perform a determination that a distance between the calculated representative line segments is equal to or less than a second threshold and an angle formed by the calculated representative line segments is equal to or less than a third threshold, on a condition that the determination is made, generate the determination grid map in which the object unoccupied region between both representative line segments is replaced with the object occupied region.

3. The in-vehicle control device according to claim 1, wherein the processor determines whether the replacement is necessary, additionally using a high-precision map created in advance.

4. The in-vehicle control device according to claim 1, wherein the processor determines whether the replacement is necessary, additionally using white line information extracted from image information captured by the image pickup device.

5. The in-vehicle control device according to claim 1, wherein, in the pre-processing grid map stored in the memory, a position of an object detected by an object detection device other than the image pickup device installed in the vehicle is also registered as the object occupied region.

* * * * *